March 23, 1943.　　W. T. WHITE ET AL　　2,314,746
FASTENER ASSEMBLY
Filed Aug. 19, 1941
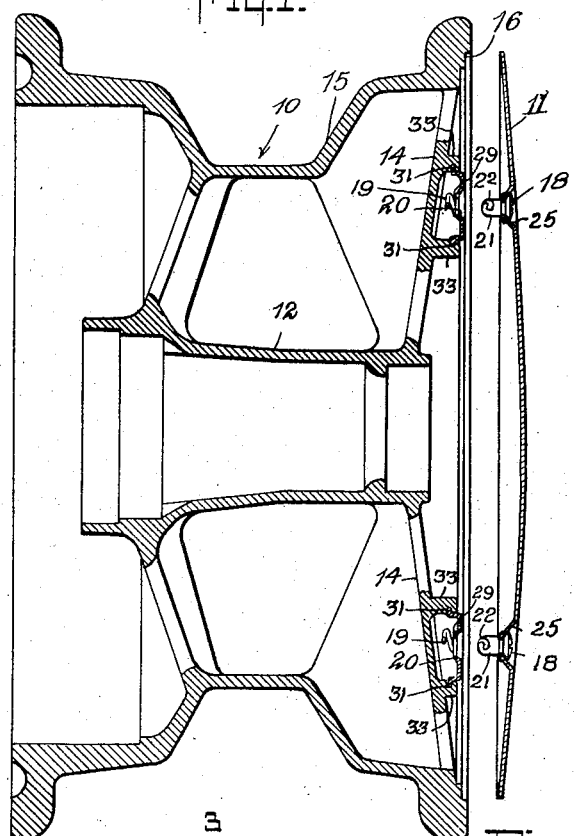
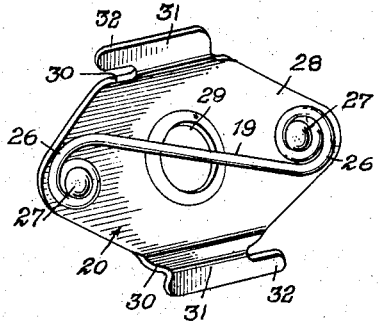
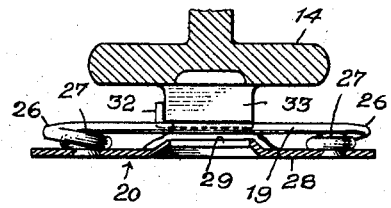
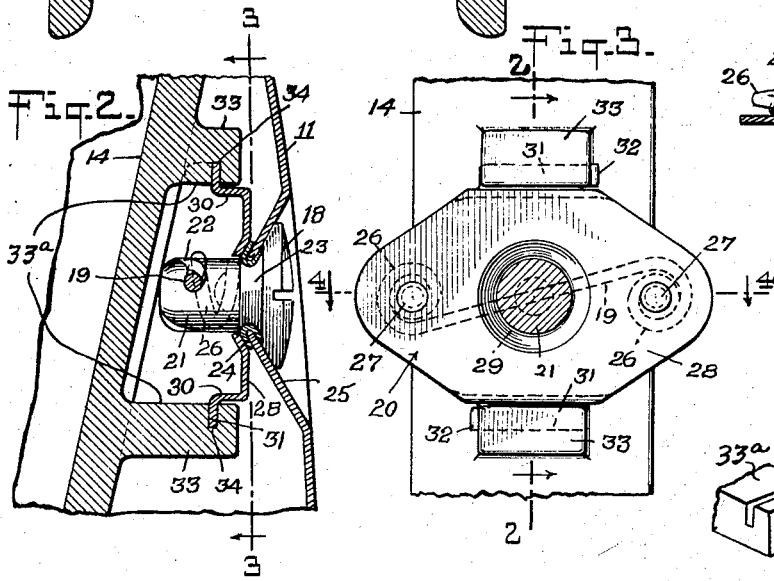
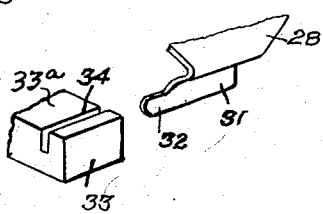
WITNESSES
INVENTORS
Will T. White
and Charles H. Zimmerman
BY
ATTORNEYS Patented Mar. 23, 1943

2,314,746

UNITED STATES PATENT OFFICE 2,314,746

FASTENER ASSEMBLY

Will T. White and Charles H. Zimmerman, Akron, Ohio, assignors to Dzus Fastener Co., Inc., Babylon, N. Y., a corporation of New York Application August 19, 1941, Serial No. 407,405

7 Claims. (Cl. 85—5)

This invention relates to an improved fastener assembly to be used in fastening two parts or articles together.

It is an object of this invention to provide an improved fastener assembly which may be used in holding two parts or articles together, which is easy to install and may be readily replaced when desired.

A further object is the provision, in a fastener assembly, of the above character, of an improved mounting for one of the fastener elements, which is of simple, inexpensive, yet durable construction.

In the accompanying drawing—

Fig. 1 is a cross sectional view of an aeroplane wheel and fairing having fastener assemblies embodying our invention;

Fig. 2 is a detail sectional view on the line 2—2 of Fig. 3 showing one of the fastener assemblies;

Fig. 3 is a front elevational view partially in section of the fastener assembly on the line 3—3 of Fig. 2;

Fig. 4 is a sectional view through the fastener assembly on the line 4—4 of Fig. 3;

Fig. 5 is a perspective view of the underside of a bracket employed in our improved fastener assembly; and Fig. 6 is a detail view of the interlocking portions of the bracket and the part to which it is connected, indicating one manner in which the bracket may be retained in position.

Our invention is particularly suited for use in connection with the fastening device shown in Patent No. 1,955,740, granted on April 24, 1934, to William Dzus, and in the accompanying drawing, the fastener assembly is illustrated in connection with a fastening device of this type. However, it should be understood that the fastener assembly may be used in connection with other types of fastening devices. For purposes of illustration, we have shown the fastener assembly as being used to attach a fairing to an aeroplane wheel for which purpose the invention is well suited. However, it should also be understood that our fastener assembly may be used to secure many other parts or articles together.

In the drawing, the numeral 10 indicates an aeroplane wheel to which the fairing 11 is releasably attached. The aeroplane wheel illustrated consists of a hub 12 connected by spokes 14 to a rim 15, one face of the rim being provided with a seat 16 to accommodate the fairing. The fairing is releasably attached to the wheel by means of our improved fastener assembly.

We have shown two separate fastener assemblies for securing the fairing in position but it should be understood that any desired number of assemblies may be employed. For example, three or more may be used on large wheels, and only one positioned centrally of the wheel may be required on small wheels.

Each fastener assembly comprises two fastener elements of the type shown in Patent No. 1,955,740, referred to above, i. e., a button or stud member 18, and a spring member 19, and also a bracket 20 which supports the spring member. The stud member is provided with an enlarged head which may be formed with a kerf, as shown, and a tubular shank 21 formed with oppositely disposed helical slots 22, each having a shoulder formed near the end thereof to prevent accidental retrograde movement as shown in the above-referred to patent. In each fastener assembly the stud member is secured to the fairing, the fairing being provided with an aperture through which the shank of the stud member projects. Immediately beneath the head, the stud member is provided with a groove 23, of smaller diameter than the shank and to prevent accidental release of the stud member, we provide a grommet 24 around the edges of the aperture in the fairing which projects inwardly into the groove. It will thus be seen that the stud member 18 is supported on the fairing so that it is free to rotate, but at the same time it is held in position against accidental release. In order to minimize air resistance, the fairing may be indented inwardly adjacent the aperture in the manner indicated by the numeral 25, so as to provide a recess to accommodate the head of the stud member.

The spring member 19 is made of strong resilient material, such as wire, and at opposite ends is formed into coils in the manner indicated at 26, the said coiled portions being secured to the device to which it is to be attached by means of rivets 27. In accordance with our present invention, the spring member 19 is attached to the bracket 20 which in turn is mounted on one of the spokes 14 of the wheel.

The bracket 20 is preferably formed with a relatively flat central portion 28 which is of sufficient length, as shown, to accommodate the spring which is attached thereto. The portion 28 of the bracket is formed with an aperture 29 in registry with the central portion of the spring to accommodate the shank 21 of the stud member when the fastening device is assembled. The edge of the aperture 21 may be turned inwardly at an angle, as shown, so as to accommodate the inner end of the indented portion of the fairing, as shown most clearly in Fig. 3. On opposite sides of the bracket, we provide the depending flanges 30 which terminate in the outwardly disposed flanges 31, each of the flanges 31 being formed with a projecting wing 32, the projecting wings on the respective flanges being formed so as to project in opposite directions.

To attach the bracket in each assembly to the wheel, we provide one of the spokes with a pair of spaced projecting posts or lugs 33, providing confronting faces 33a each having a transverse slot 34 disposed near the head thereof, and the flanges 31 are positioned in the slots. The wings 32 project beyond the ends of the posts and are turned upwardly or downwardly in the manner indicated in Figs. 3 and 4. Since the wings 32 are formed on opposite sides of the respective flanges, it will be seen that the bracket is effectively held in position against accidental release. The distance between the posts 33 is sufficient to accommodate the width of the bracket 20 and to permit the flanges 31 to project into the slots 34 in the manner shown.

It will be understood from the foregoing description of our invention that our improved fastener assembly is of relatively simple and inexpensive construction and may be readily assembled and may be readily replaced when desired. In assembling the device the spring member is attached to the bracket 20. The bracket may then be conveniently secured in position by sliding the flanges 31 into the slots 34 and then bending the wings 32 at a sharp angle to prevent any accidental movement or displacement of the bracket. The stud member in turn is secured in position in the usual manner as by means of the grommet 24. The stud member is, of course, in registry with the aperture 29 in bracket 20 so that when the fairing is placed in its seat 16, the stud will project through the aperture 29. By rotating the stud member, the spring member is engaged in the helical slots and is interlocked with the stud member against accidental release. When it is desired to release the fastening device, the stud member is rotated in an opposite direction. When for some reason or other, it is desired to replace the spring member, this can be done in a simple and convenient manner by replacing the entire spring mounting consisting of a bracket with the spring attached thereto.

In the particular form of the invention shown, the outer periphery of the fairing 11 engages with the seat 16 of the wheel 10 just before the grommet 24 seats with the bracket 20. Thus, tightening the grommet 24 down against the bracket 20, by turning the studs 21, puts a tension into the fairing so that its periphery stays in tight contact with the seat 16 and vibration of the fairing and fastener assembly is eliminated. We contemplate having the fairing engage with other portions of the wheel besides the seat 16, for example, the fairing may engage with the posts or lugs 33 which may be made somewhat longer to facilitate this engagement.

It should be understood that while we have illustrated one specific embodiment of our invention, that many modifications may be made therein within the purview of the invention. Thus, for instance, the fastener assembly may be used in connection with other types of fastening devices, and may be used for securing many different parts or articles together, other than aeroplane wheels and fairings.

We claim:

1. In a fastener assembly for securing two articles or parts together a mounting for a fastener member comprising a bracket having a relatively flat portion formed with an aperture adjacent the center thereof, and means for attaching the bracket to one of the articles or parts comprising a depending flange connected to the relatively flat portion, an outwardly projecting flange connected to the depending flange and a projecting wing formed on the laterally projecting flange projecting beyond the connection between the flange and the bracket, said wing being cooperable to be disposed at an angle to the remainder of the flange.

2. In a fastener assembly for securing two articles or parts together a mounting for a fastener member comprising a bracket having a relatively flat portion formed with an aperture adjacent the center thereof, and means for attaching the bracket to one of the articles or parts comprising depending flanges connected to opposite sides of the relatively flat portion, outwardly projecting flanges connected to the ends of the depending flanges and wings projecting from one end of each of the projecting flanges in opposite relationship.

3. In a fastener assembly for securing two articles or parts together the combination of means formed on one of the articles or parts provided with a slot and a mounting for a fastener member comprising a bracket and means for attaching the bracket to the article or part comprising a depending flange, a second flange projecting from the depending flange and positioned in the said slot and a wing formed on the second flange projecting beyond the slot and formed at an angle to the second flange to resist movement thereof with respect to the slot.

4. In combination, an article formed with means presenting a pair of confronting faces, each formed with a substantially transverse slot therein, and an attachment for said article comprising a body portion and a pair of flanges projecting from opposite sides of the body portion and positioned in said slots, each of the flanges being formed with a wing projecting beyond the end of the slot and formed at an angle thereto, the said wings on the two flanges being arranged in opposite relationship so as to resist movement of the bracket with respect to the article or part.

5. In a fastener assembly for securing two articles or parts together, the combination of means formed on one of the parts presenting a pair of confronting faces, each formed with a substantially transverse relatively deep slot therein, and a mounting for a fastener assembly comprising a bracket having a body portion and a pair of flanges on opposite sides of the body portion, the flanges being positioned in and projecting substantially to the bases of the respective slots whereby the flanges can be removed from the slots only by longitudinally sliding them in the slots.

6. The combination as set forth in claim 5 in which means are provided for preventing the flanges from sliding in the slots.

7. The combination as set forth in claim 5 in which the flanges are provided with wings projecting beyond the slots and disposed at an angle thereto so as to prevent the flanges from sliding in the slots.

WILL T. WHITE.
CHARLES H. ZIMMERMAN.